(12) United States Patent
Koehler et al.

(10) Patent No.: US 10,824,379 B2
(45) Date of Patent: Nov. 3, 2020

(54) AUXILIARY DEVICE IDENTIFICATION

(71) Applicant: Hewlett-Packard Development Company, L.P., Houston, TX (US)

(72) Inventors: Duane A Koehler, Vancouver, WA (US); David J Gembala, Portland, OR (US); Mark Jon Westlund, Vancouver, WA (US); Ed Tucker, Vancouver, WA (US); Jerrod Houston Tyler, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/774,207

(22) PCT Filed: Mar. 7, 2016

(86) PCT No.: PCT/US2016/021139
§ 371 (c)(1),
(2) Date: May 7, 2018

(87) PCT Pub. No.: WO2017/155500
PCT Pub. Date: Sep. 14, 2017

(65) Prior Publication Data
US 2019/0034135 A1    Jan. 31, 2019

(51) Int. Cl.
*G06F 15/00*    (2006.01)
*G06F 3/12*    (2006.01)
(Continued)

(52) U.S. Cl.
CPC ....... *G06F 3/1231* (2013.01); *G03G 15/6502* (2013.01); *G03G 21/1652* (2013.01);
(Continued)

(58) Field of Classification Search
CPC .............. G06F 3/1231; G03G 21/1652; G03G 2221/1696; G06K 15/16; G06K 15/4025
(Continued)

(56) References Cited

U.S. PATENT DOCUMENTS 3,805,277 A * 4/1974 Domnick ............... G03B 19/04
396/207
5,017,972 A   5/1991 Daughton et al.
(Continued)

FOREIGN PATENT DOCUMENTS

CN          104570653 A       4/2015
KR       1020070001368       1/2007

OTHER PUBLICATIONS

Ben Hopf, Application Report, Oct. 2011, Texas Instruments, SLVA485, All pages (Year: 2011).*
(Continued)

*Primary Examiner* — Douglas Q Tran
(74) *Attorney, Agent, or Firm* — HP Inc. Patent Department

(57) ABSTRACT

An example system includes a primary device and at least one auxiliary device connected in series with the primary device. The auxiliary device has an identifier indicative of a position of the auxiliary device in the series. The identifier is based on a resistance value associated with the auxiliary device, the resistance value being based at least in part on an upstream device in the series.

7 Claims, 7 Drawing Sheets

(51) Int. Cl.
*G06K 1/00* (2006.01)
*G03G 21/16* (2006.01)
*G06K 15/00* (2006.01)
*G03G 15/00* (2006.01)
*G06K 15/16* (2006.01)

(52) U.S. Cl.
CPC .......... *G06F 3/1203* (2013.01); *G06F 3/1282* (2013.01); *G06K 15/16* (2013.01); *G06K 15/4025* (2013.01); *G03G 15/65* (2013.01); *G03G 2221/1696* (2013.01)

(58) Field of Classification Search
USPC .............................. 358/1.15, 1.1, 1.13, 1.14
See application file for complete search history.

(56) References Cited

U.S. PATENT DOCUMENTS

| | | |
|---|---|---|
| 6,267,522 B1 | 7/2001 | Slippy et al. |
| 8,184,314 B2 * | 5/2012 | Oh .......................... B65H 3/44 |
| | | 358/1.13 |
| 2002/0015184 A1 | 2/2002 | Hatakeyama |
| 2003/0048474 A1 | 3/2003 | Hong et al. |
| 2003/0096540 A1 | 5/2003 | Hong |
| 2010/0066013 A1 | 3/2010 | Hanada et al. |
| 2010/0177335 A1 | 7/2010 | Oh |
| 2014/0293337 A1 | 10/2014 | Hirayama |
| 2017/0205900 A1 * | 7/2017 | Su ....................... G06F 3/03543 |

OTHER PUBLICATIONS

Toshiba TEC Corporation, Muttiturictional Digital Color Systems. Aug. 7, 2008—300 pages.

\* cited by examiner

US 10,824,379 B2

AUXILIARY DEVICE IDENTIFICATION

BACKGROUND

Various environments can accommodate systems, such as modular systems, with optional devices to be added. For example, a system may include a main device to which one or more auxiliary devices may be coupled. One example of such a system is a printer system which may include a main printer with optional paper trays that may be stacked under the printer to provide different sizes or types of paper.

BRIEF DESCRIPTION OF THE DRAWINGS

For a more complete understanding of various examples, reference is now made to the following description taken in connection with the accompanying drawings in which.

DETAILED DESCRIPTION

Various examples described herein provide for identification of an auxiliary device, such as a printer paper tray, connected to a main device, such as a printer. In various examples, one or more identical auxiliary devices may connected to the main device in a series, such as a stack of paper trays below a printer. The auxiliary devices are associated with an identifier based on their position in the series. For example, each tray in the stack of paper trays may be associated with an identifier based on its position in the stack. Thus, even if trays are exchanged, the identifier remains associated with the position in the stack.

As noted above, many environments use systems with optional devices to be added. For example, workgroup printers may select from multiple paper trays, each with a specific paper size (e.g., letter size, legal, A4, etc.) or type (plain, 3-hole punch, etc.). For purposes of efficiency, each paper tray may have a common design. With a common design for interchangeability, designation of each tray by the printer may be difficult. In this regard, various examples described herein provide for simple, unique identification of each tray based on its position in the stack with no changes or configuration of the hardware.

Figure 1:
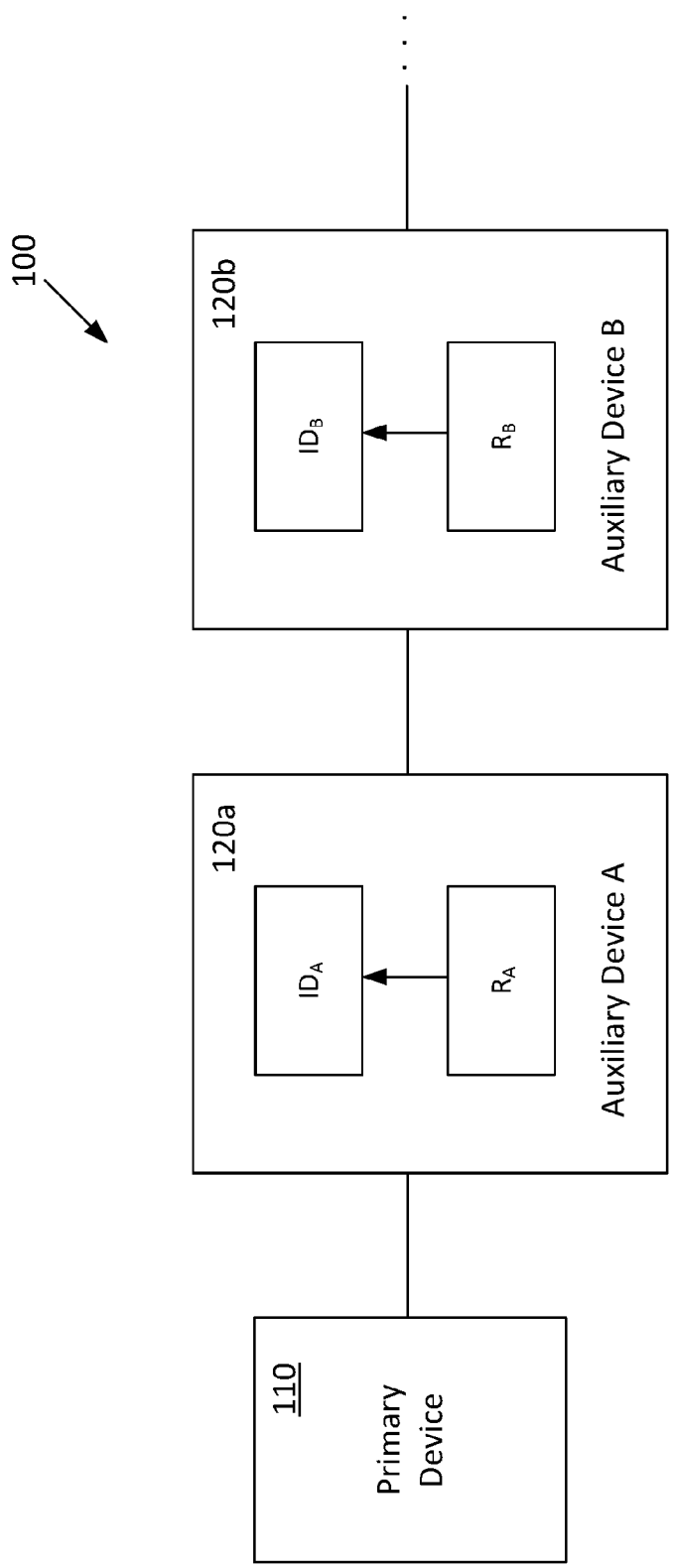
FIG. 1 illustrates an example system with a primary device and auxiliary devices.

Referring now to the figures, FIG. 1 illustrates an example system with a primary device and auxiliary devices. The example system 100 includes a primary device 110 and a series of auxiliary devices 120a, 120b. As used herein, the terms "upstream" and "downstream" refer to the order of the devices, with the primary device 110 being most upstream and successive auxiliary devices 120a, 120b being downstream. In one example, the primary device 110 is a printing device, and the auxiliary devices 120a, 120b are paper trays which may provide paper to the printing device for printing thereon.

Each auxiliary device 120a, 120b of the example system 100 is associated with an identifier IDA, IDB. Each identifier IDA, IDB indicates the position of the corresponding auxiliary device 120a, 120b in the series relative to the primary device 110. For example, the identifier IDA associated with the first auxiliary device 120a may indicate that the associated device is in the first position downstream from the primary device 110. Similarly, the identifier IDB associated with the second auxiliary device 120b may indicate that the associated device is in the second position downstream from the primary device 110. Additional devices may be added downstream and may be associated with similar identifiers to indicate their corresponding position.

As described greater detail with reference to various examples below, each identifier may be based on a corresponding resistance value. For example, in the example of FIG. 1, the identifier $ID_A$ may be based on a resistance value $R_A$ associated with the first auxiliary device 120a. Similarly, the identifier $ID_B$ may be based on a resistance value $R_B$ associated with the second auxiliary device 120b. In various examples, each resistance value is based at least in part on an upstream device in the series. For example, the resistance value $R_A$ associated with the first auxiliary device 120a may be based at least in part on the primary device 110 which is upstream of the first auxiliary device 120a. Similarly, the resistance value $R_B$ associated with the second auxiliary device 120b may be based at least in part on the first auxiliary device 120a which is upstream of the second auxiliary device 120b.

Figure 2:
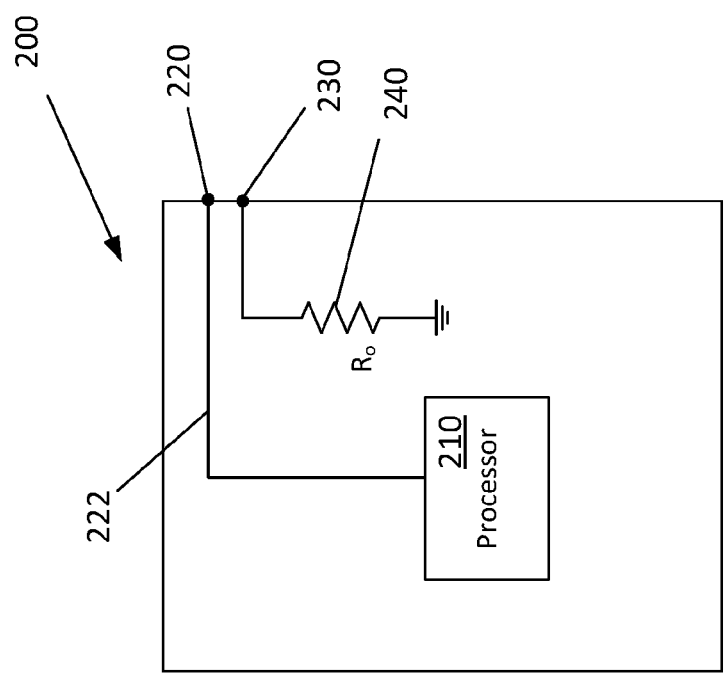
FIG. 2 illustrates an example primary device.

Referring now to FIG. 2, an example primary device 200 is illustrated. Of course, the example primary device 200 may include additional components not illustrated in FIG. 2. For example, in the case of a printing device, the example primary device 200 may include an image forming portion. Further, the example primary device 200 may include a power subsystem and other such components, for example. For purposes of simplicity and understanding, the example primary device 200 illustrated in FIG. 2 is shown only with certain components relevant to the present disclosure.

The example primary device 200 includes a processor 210 for controlling various aspects of the primary device 200. In addition to controlling the primary device 200, the processor 210 may communicate with and control certain aspects of other devices (e.g., auxiliary devices 300 as illustrated below in FIG. 3). In this regard, the primary device 200 is connected to an electronic line 222 leading to a contact 220 through which the processor 210 of the primary device 200 may communicate with other devices.

The primary device 200 may be provided with additional contacts, such as contact 230, through which the primary device 200 may interface with other devices. As illustrated in the example of FIG. 2, the primary device 200 is provided with a base resistor 240, one end of which is connected to the contact 230 and the other end of which is grounded. The base resistor 240 of the primary device 200 has a resistance value $R_0$ which may be selected based on a variety of factors, as described in greater detail below.

Figure 3:
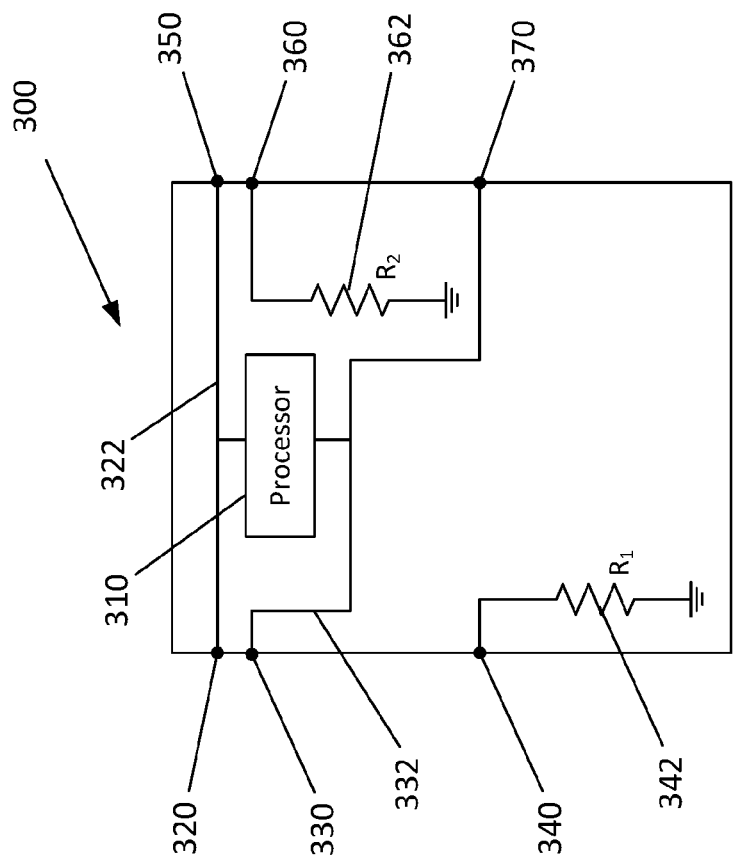
FIG. 3 illustrates an example auxiliary device.

Referring now to FIG. 3, an example auxiliary device 300 is illustrated. As with the example primary device 200 described above with reference to FIG. 2, the example auxiliary device 300 of FIG. 3 may include additional components not illustrated in FIG. 3. For example, in the case of a printing paper tray, the example auxiliary device 300 may include a paper feeding portion including rollers. For purposes of simplicity and understanding, the example auxiliary device 300 illustrated in FIG. 3 is shown only with certain components relevant to the present disclosure.

The example auxiliary device 300 includes a processor 310 for controlling various aspects of the auxiliary device 300. The processor 310 may communicate with and receive commands from, for example, the primary device 200 of FIG. 2. In this regard, the example auxiliary device 300 is provided with a contact 320 which may interface with the contact 220 of the example primary device 200 of FIG. 2.

The auxiliary device 300 may be provided with additional contacts, such as contact 330, which allows the auxiliary device 330 to interface with contact 230 of the example primary device 200 of FIG. 2. As illustrated in the example of FIG. 3, the auxiliary device 300 is provided with a contact 340 which is connected to a resistor 342. The other end of the resistor 342 is grounded. The resistor 342 of the auxiliary device 300 has a resistance value $R_1$ which may be selected based on a variety of factors, as described in greater detail below.

The example auxiliary device 300 of FIG. 3 includes a communication line 322 leading from the contact 320 on one side to another contact 350 on the other side. As illustrated in FIG. 1 and described below, the contacts 320, 350 allow connection of multiple devices in series. The contacts 320, 350 further allow communication between the processor 310 of the example auxiliary device 300 and processors in other devices, such as the processor 210 of the example primary device 200.

The auxiliary device 300 is provided with a contact 360 which is connected to another resistor 362. The other end of the resistor 362 is grounded. The resistor 362 of the auxiliary device 300 has a resistance value $R_2$ which may be selected based on a variety of factors, as described in greater detail below.

The example auxiliary device 300 of FIG. 3 includes a second communication line 332 leading from the contact 330 on one side to another contact 370 on the other side. As described below, the contacts 330, 370 allow formation of a circuit which may be monitored by the processor 310.

Figure 4:
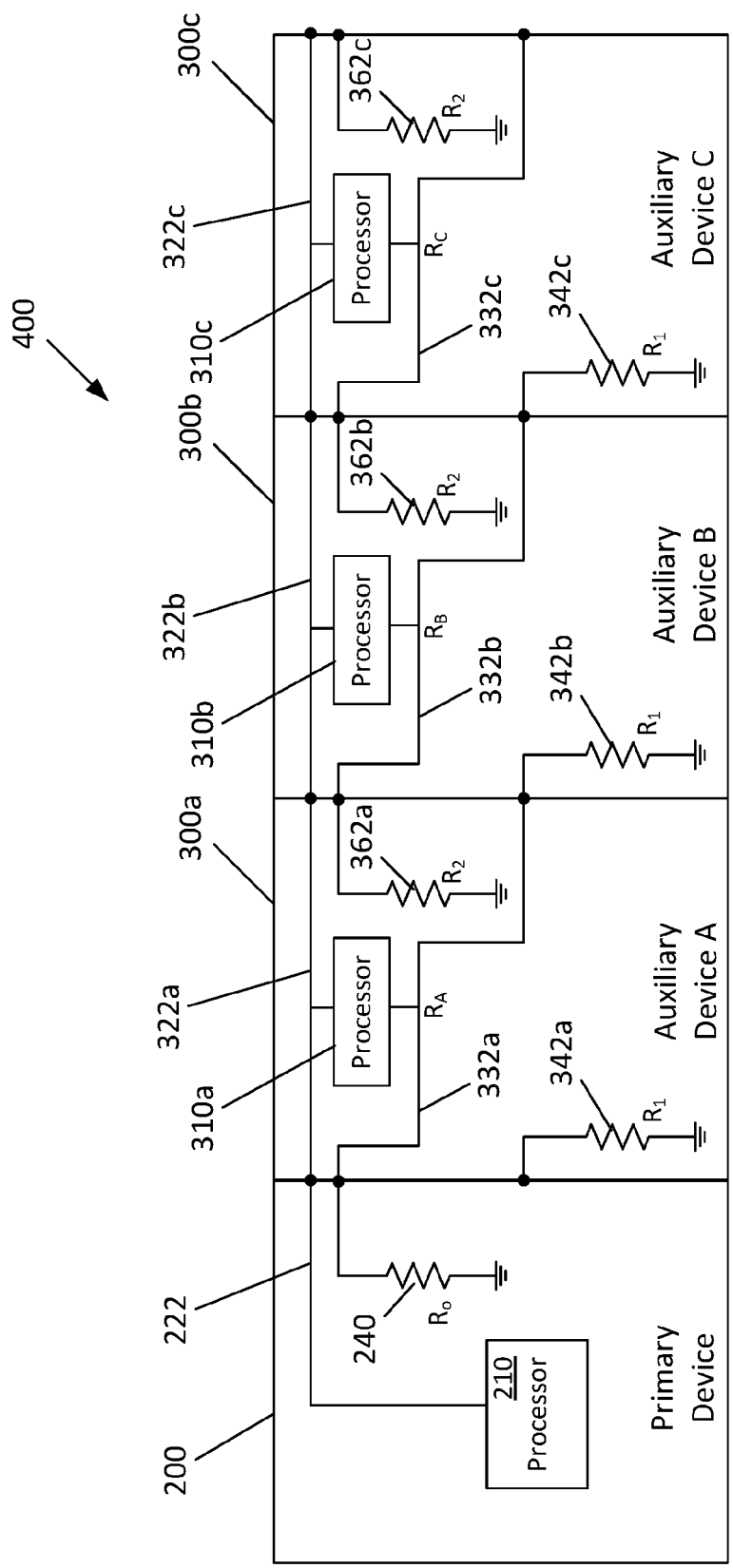
FIG. 4 illustrates an example system with the primary device of FIG. 2 and auxiliary devices of FIG. 3.

Referring now to FIG. 4, an example system 400 includes a primary device 200 and a series of auxiliary devices 300. In the example of FIG. 4, the system 400 is provided with three auxiliary devices 300a, 300b, 300c. The auxiliary devices 300a, 300b, 300c are identical to one another, thereby facilitating interchangeability in the auxiliary devices. In various examples, each auxiliary device may be associated with an identifier that may be used by the primary device 200 to communicate with a selected one of the auxiliary devices 300a, 300b, 300c, for example. In this regard, the identifier associated with each auxiliary device is indicative of a position of the auxiliary device in the series. For example, the identifier associated with the first auxiliary device 300a in the series may be indicative of its position as the first auxiliary device downstream from the primary device 200. In the case of printing devices, the identifier of the first auxiliary device 300a may indicate that it is the first external paper tray.

In examples described herein, the identifier associated with each auxiliary device 300 is based on a resistance value associated with the respective auxiliary device. In various examples, the resistance value for each auxiliary device is different from all other auxiliary devices in the series. As described below, the resistance value for each auxiliary device 300a, 300b, 300c may be based at least in part on an upstream device in the series. For example, the resistance value of the first auxiliary device 300a is based at least in part on the primary device 200 positioned immediately upstream of the first auxiliary device 300a.

The association of an identifier with each auxiliary device 300a, 300b, 300c of the example system 400 of FIG. 4 will now be described. Upon coupling of the primary device 200 and the various auxiliary devices 300a, 300b, 300c, various contacts described above with reference to FIGS. 2 and 3 cause certain connections to be formed between adjacent devices. For example, coupling of the primary device 200 to the first auxiliary device 300a causes connection of the line 222 of the example primary device 200 to connect to the line 322a of the first auxiliary device 300a, thereby forming a connection between the processor 210 of the primary device 200 and the processor 310a of the first auxiliary device 300a. Further, the line 332a of the first auxiliary device 300a is connected to the base resistor 240 of the primary device 200.

Similarly, coupling of the second auxiliary device 300b to the first auxiliary device 300a causes connection of the line 322a of the first auxiliary device 300a to connect to the line 322b of the second auxiliary device 300b, thereby forming a connection between the processor 310a of the first auxiliary device 300a and the processor 310b of the second auxiliary device 300b. Further, the line 332b of the second auxiliary device 300b is connected to the second resistor 362a of the first auxiliary device 300a, and the line 332a of the first auxiliary device 300a is connected to the first resistor 342b of the second auxiliary device 300b.

Coupling of the third auxiliary device 300c to the second auxiliary device 300b causes connection of the line 322b of the second auxiliary device 300b to connect to the line 322c of the third auxiliary device 300c, thereby forming a connection between the processor 310b of the second auxiliary device 300b and the processor 310c of the third auxiliary device 300c. Further, the line 332c of the third auxiliary device 300c is connected to the second resistor 362b of the second auxiliary device 300b.

With the formation of the connections described above and illustrated in the example of FIG. 1, certain circuits are completed which may be monitored by the processor 310a, 310b, 310c of each auxiliary device 300a, 300b, 300c. For example, the processor 310a of the first auxiliary device 300a may monitor the circuit formed by the base resistor 240 of the primary device, the line 332a of the first auxiliary device 300a and the first resistor 342b of the second auxiliary device 300b. Similarly, the processor 310b of the second auxiliary device 300b may monitor the circuit formed by the second resistor 362a of the first auxiliary device 300a, the line 332b of the second auxiliary device 300b and the first resistor 342c of the third auxiliary device 300b. Also, the processor 310c of the third auxiliary device 300c may monitor the circuit formed by the second resistor 362b of the second auxiliary device 300a and the line 332c of the third auxiliary device 300c.

As noted above, each auxiliary device 300a, 300b, 300c may be associated with an identifier indicative of a position of the auxiliary device in the series. In the example of FIG. 4, the identifier of each auxiliary device 300a, 300b, 300c is based on a resistance value associated with the respective auxiliary device. In this regard, the processor 310a, 310b, 310c of each auxiliary device 300a, 300b, 300c may determine a resistance value associated with the respective auxiliary device. In the example of FIG. 4, the processor 310a of the first auxiliary device 300a may determine a resistance value of the circuit formed by the base resistor 240 of the primary device, the line 332a of the first auxiliary device 300a and the first resistor 342b of the second auxiliary device 300b. In this regard, a voltage signal may be applied by the device immediately upstream of the first auxiliary device. Thus, the processor 210 of the primary device 200, for example, may apply a voltage signal through the processor 310a of the first auxiliary device 300a via the line 322a. The processor 310a of the first auxiliary device 300a may then determine a resistance value $R_A$ associated with the first auxiliary device 300a. As determined by the processor 310a, the base resistor 240 of the primary device 200 having a resistance value $R_0$ and the first resistor 342b of the second auxiliary device 300b having a resistance value $R_1$ are in parallel. Thus, the resistance value $R_A$ is determined as $R_0//R_1$. In some examples, the determination of the resistance value $R_A$ is made by the processor 310 of the auxiliary device 300. In other example, the processor 310 may be unnecessary. For example, the determination of the resistance value $R_A$ may be made using an analog comparator circuit. In other examples, the determination may be made using an analog-to-digital (A/D) converter and a microprocessor.

Similarly, the processor 310b of the second auxiliary device 300b may determine a resistance value $R_B$ of the circuit formed by the second resistor 362a of the first auxiliary device 300a, the line 332b of the second auxiliary device 300b and the first resistor 342c of the third auxiliary device 300b based on a voltage signal from the processor 310a of the first auxiliary device 300a. As determined by the processor 310b, the second resistor 362a of the first auxiliary device 300a having a resistance value $R_2$ and the first resistor 342c of the third auxiliary device 300c having a resistance value $R_1$ are in parallel. Thus, the resistance value $R_B$ is determined as $R_2//R_1$.

Further, the processor 310c of the third auxiliary device 300c may determine a resistance value $R_C$ of the circuit formed by the second resistor 362b of the second auxiliary device 300b and the line 332c of the third auxiliary device 300c based on a voltage signal from the processor 310b of the second auxiliary device 300b. Since the downstream end of the line 332c is open, the processor 310c determines the resistance value $R_C$ as $R_2//OPEN$.

In one example, the base resistor 240 of the primary device 200 has a resistance value $R_0$ of 0 Ohms, and each resistor 342, 362 in each example auxiliary device 300a, 300b, 300c has a resistance value $R_1$ and $R_2$ of 2.2 KOhms. Thus, the resistance values determined by the processors 310a, 310b, 310c of the first, second and third auxiliary devices are $R_A=R_0//R_1=0$ Ohms, $R_B=R_2//R_1=1.1$ KOhms and $R_C=R_2//OPEN=2.2$ KOhms, respectively. In various examples, the resistance values of each of the resistors may be selected to provide a desired resistance value for each auxiliary devie.

Thus, the arrangement of the resistors results in a different resistance value for each of the three auxiliary devices 300a, 300b, 300c. The processor 310a, 310b, 310c in each auxiliary device 300a, 300b, 300c may be provided with a mapping of resistance values to an identifier. Thus, the physical location of the auxiliary device in the series of devices may be uniquely identified.

Figure 6:
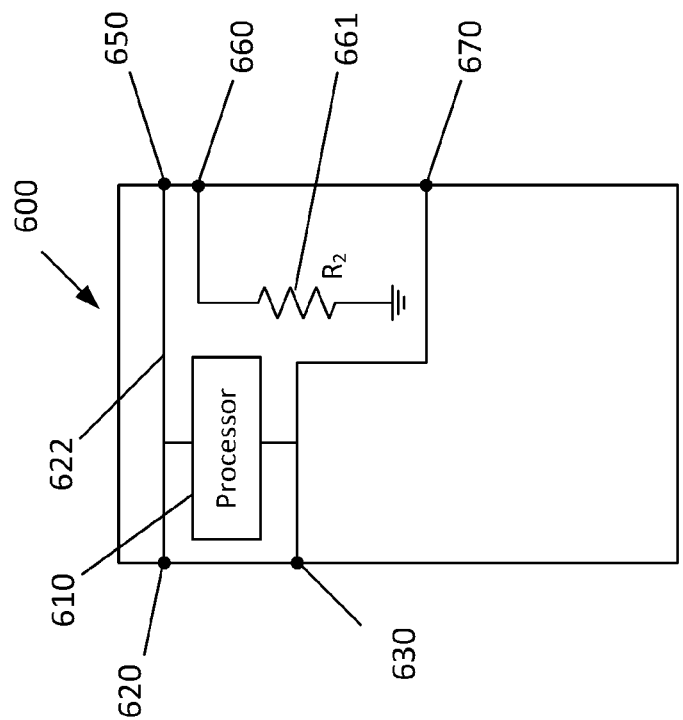
FIG. 6 illustrates another example auxiliary device.
Figure 5:
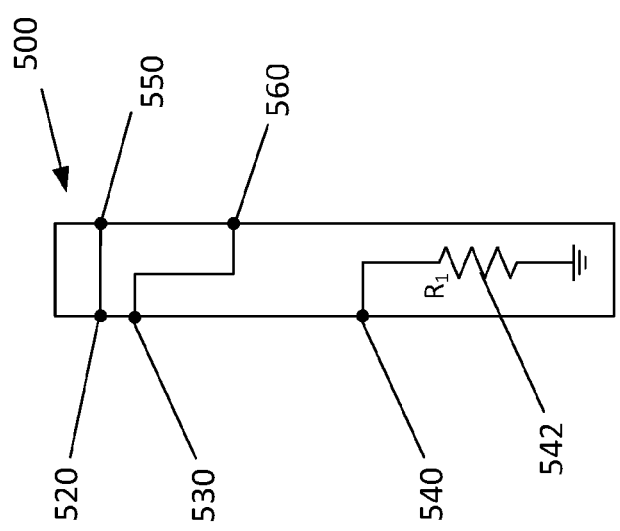
FIG. 5 illustrates an example interface device.

In some examples, the various components of the auxiliary device may divided into a main auxiliary device and an interface device. For example, FIG. 5 illustrates an example interface device 500, and FIG. 6 illustrates an example main auxiliary device 600. Referring first to FIG. 5, the example interface device 500 includes contact points 520 and 530 which may correspond to the contacts 320 and 330 of the example auxiliary device 300 of FIG. 3. Each of the contacts 520, 530 interface with an electronic line that leads to contacts 550, 560 on the other side, respectively. As illustrated in the example of FIG. 5, the interface device 500 is provided with a contact 540 which is connected to a resistor 542, which may correspond to contact 340 and resistor 342 of the example auxiliary device 300 of FIG. 3. The other end of the resistor 542 is grounded.

Referring now to FIG. 6, the example main auxiliary device 600 includes a processor 610 similar to the processor 310 of the example auxiliary device 300 of FIG. 3. The processor 610 may communicate with the primary device 200 of FIG. 2 through a contact 620 which may interface with the contact 550 of the example interface device 500 of FIG. 5.

The example main auxiliary device 600 is also provided with contact 630 for connecting with contact 560 of the interface device 500. The example main auxiliary device 600 of FIG. 6 includes a communication line 622 corresponding to the line 322 of the example auxiliary device 300 of FIG. 3. As illustrated in FIG. 6, the downstream side of the main auxiliary device 600 includes additional contacts 650, 660, 670 which allow connection of the main auxiliary device 600 to additional devices. The example main auxiliary device 600 is provided with a resistor 662 connected to the contact 660, corresponding to the resistor 362 of the auxiliary device 300 of FIG. 3.

Figure 7:
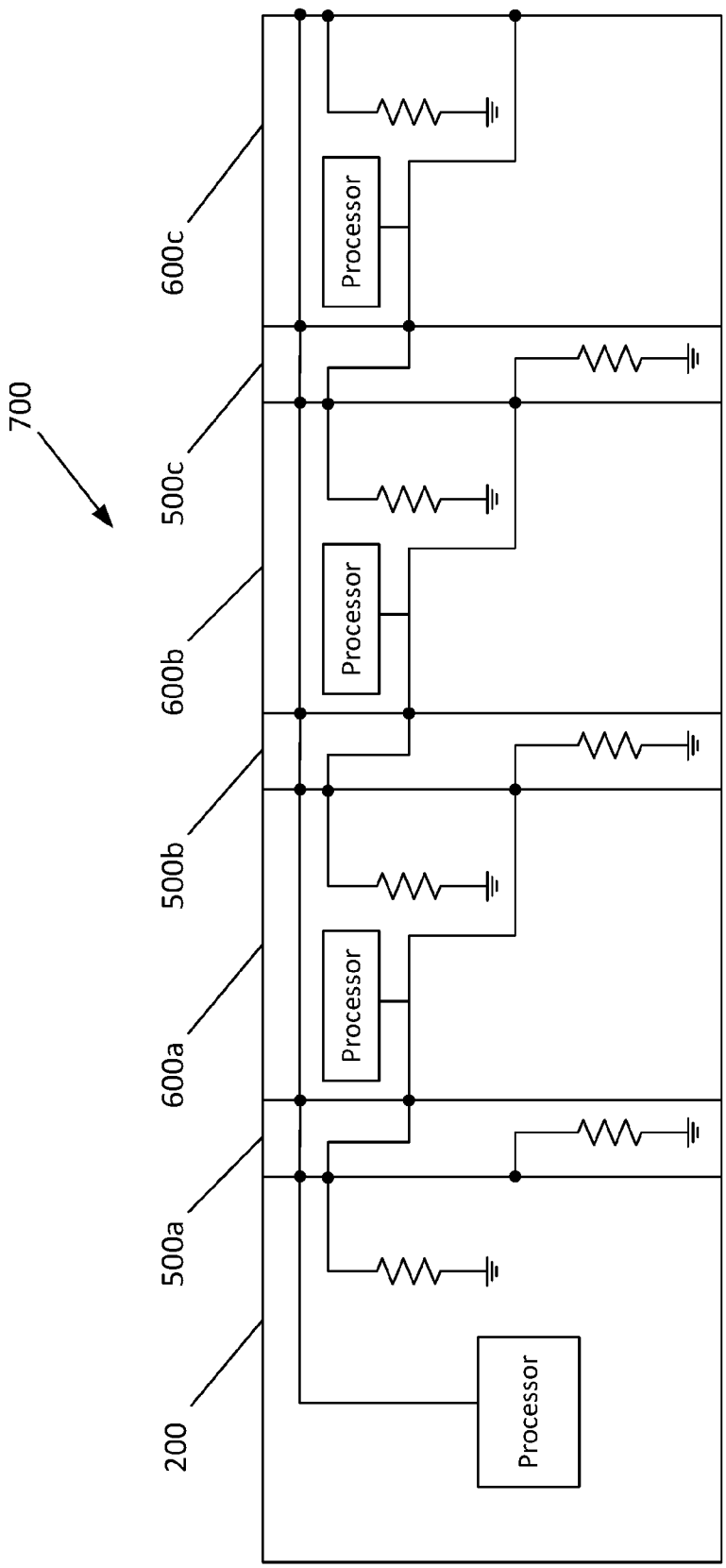
FIG. 7 illustrates another example system with a primary device, interface devices and auxiliary devices.

FIG. 7 illustrates an example system 700 with a primary device 200 of FIG. 2, interface devices 500 of FIG. 5 and main auxiliary devices 600 of FIG. 6. The system 700 of FIG. 7 is similar to the system 400 of FIG. 4, but the architecture of the auxiliary device 300 in FIG. 4 has been divided among the interface devices 500 and main auxiliary devices 600. In one example, the primary device 200 and each main auxiliary device 600 may be provided to the user with an interface device 500 coupled to the downstream end. When assembling the system 700, the user may either leave the interface device 500 attached or remove the interface device 500. In particular, if the interface device 500 is to be coupled to another downstream device (e.g., a main auxiliary device 600), the interface device 500 may be left in place to couple to the downstream device. For example, in the example system 700 of FIG. 7, the primary device 200 may be provided with the first interface device 500a, which may be left in place to allow coupling of a first main auxiliary device 600a. Similarly, the first main auxiliary device 600a may be provided with a second interface device 500b, which may be left in place to allow coupling of a second main auxiliary device 600b. Further, the second main auxiliary device 600b may be provided with a third interface device 500c, which may be left in place to allow coupling of a third main auxiliary device 600c.

On the other hand, if no additional downstream device is to be coupled to the interface device 500, a user may remove the interface device 500. For example, in the example system 700 of FIG. 7, the third main auxiliary device 600c may have been provided with an interface device (not shown). Since no further downstream devices are to be coupled, the user may remove the interface device. Thus, a system architecture similar to that of FIG. 4 is achieved, allowing an identifier to be associated with each main auxiliary device 600a, 600b, 600c based on a resistance value.

Figure 8:
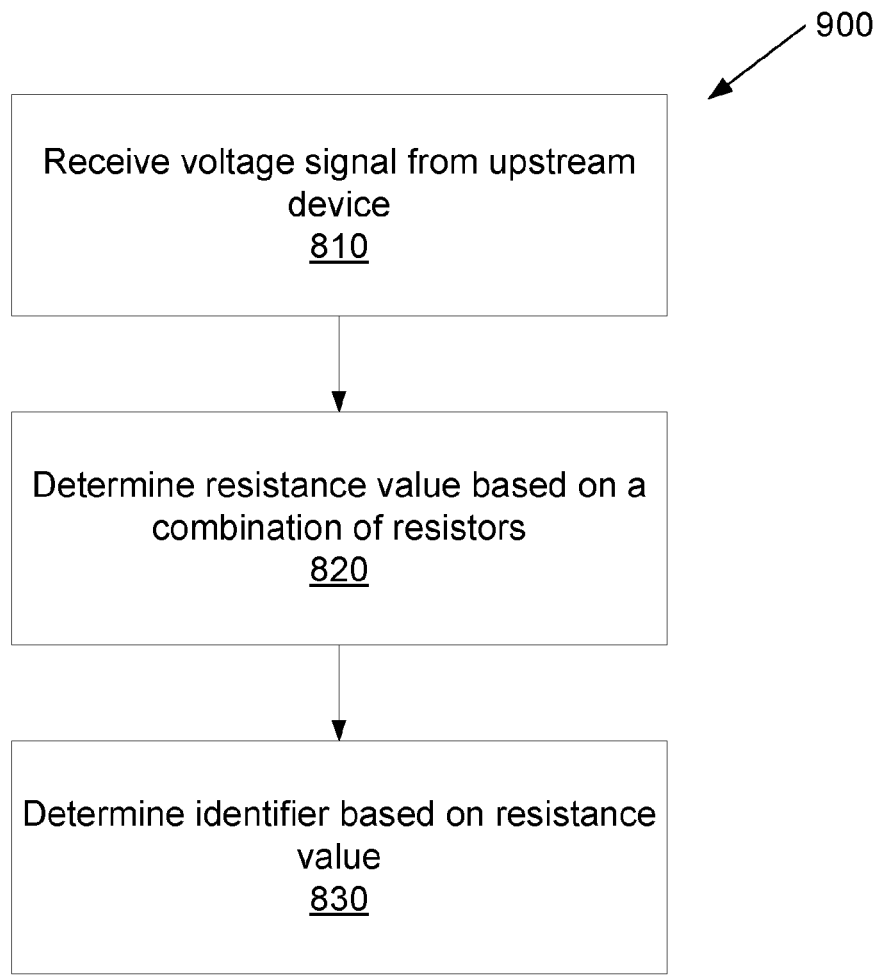
FIG. 8 is a flow chart illustrating an example process for determining an identifier for an auxiliary device.

Referring now to FIG. 8, a flow chart illustrates an example process 800 for determining an identifier for an auxiliary device. The process 800 may be implemented in the example system 400 of FIG. 4 or in the example system 700 of FIG. 7. In various examples, the process 800 may be implemented in each auxiliary device 300 of FIG. 4 or each main auxiliary device 600 of FIG. 7.

In accordance with the example process 800, an auxiliary device may receive a voltage signal from an upstream device (block 810). As described above, a processor of an auxiliary device may receive a signal from the primary device or another auxiliary device. The voltage may be applied to a circuit that is monitored by the processor of the auxiliary device. Using the applied voltage, the processor may determine the resistance value of the circuit, for example (block 820). In various examples the resistance value is based on a combination of resistors. The combination of resistors may be different for each auxiliary device in the series of devices. For example, as described above with reference to FIG. 4, the resistance value $R_A$ for the first auxiliary device 300a is based on a combination of $R_0$ and $R_1$, the resistance value $R_B$ for the second auxiliary device 300b is based on a combination of $R_2$ and $R_1$, and the resistance value $R_C$ for the third auxiliary device 300c is based on a combination of $R_2$ and an open contact. As described above, the circuit may include at least one resistor in an upstream device. For example, with reference to FIG. 4, the processor 310a of the first auxiliary device 300a monitors a circuit with includes the base resistor 240 in the upstream primary device 200.

Referring again to FIG. 8, the processor may determine an identifier of the auxiliary device based on the resistance value (block 830). As described above with reference to the example of FIG. 4, the arrangement of the resistors allows each auxiliary device to have a different resistance value. Each resistance value may be mapped to a different identifier, the identifier being indicative of the physical location of the auxiliary device in the series of devices.

Figure 9:
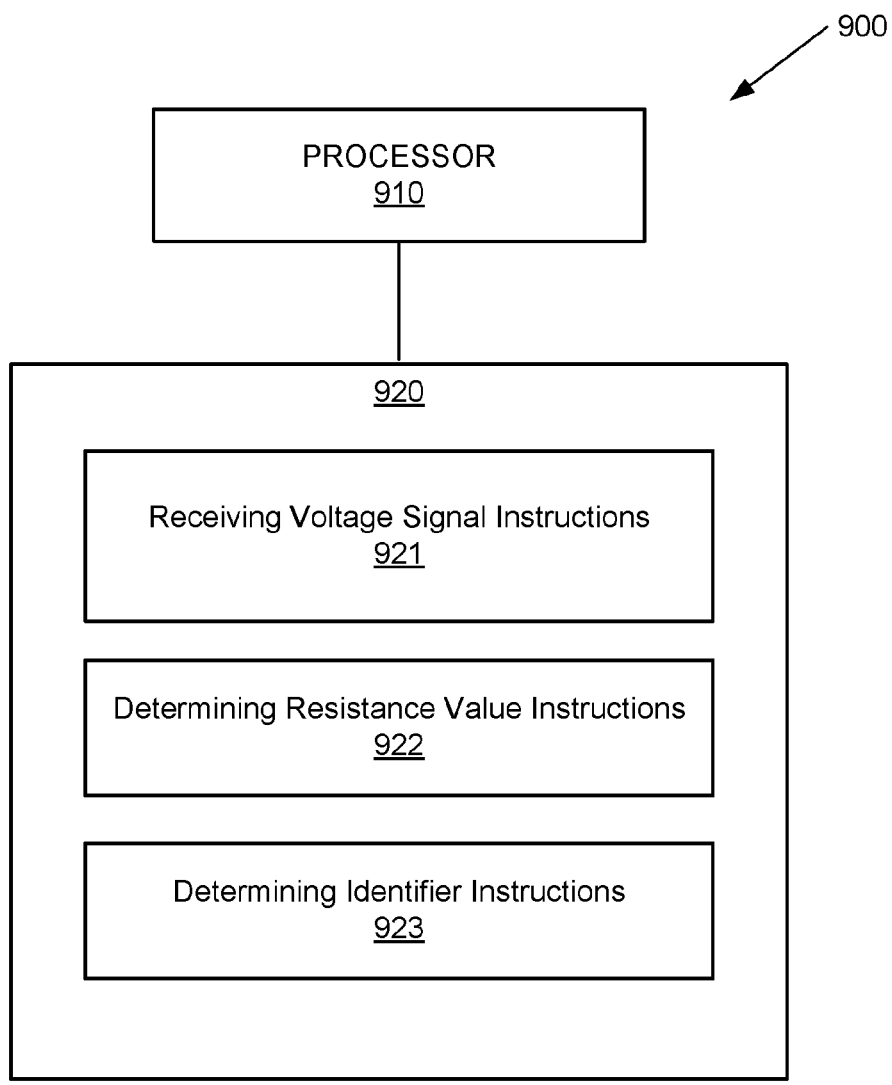
FIG. 9 illustrates a block diagram of an example system with a computer-readable storage medium including instructions executable by a processor for determining an identifier for an auxiliary device.

Referring now to FIG. 9, a block diagram of an example system 900 is illustrated with a computer-readable storage medium including instructions executable by a processor for determining an identifier for an auxiliary device. The system 900 includes a processor 910 and a computer-readable storage medium 920. The computer-readable storage medium 920 includes example instructions 921-923 executable by the processor 910 to perform various functionalities described herein.

The example instructions include receiving voltage signal instructions 921. As described above, a processor of an auxiliary device may receive a voltage signal from an upstream device, and the voltage may be applied to a circuit that is monitored by the processor of the auxiliary device. The example instructions further include determining resistance value instructions 922. In this regard, the processor may use the applied voltage to determine the resistance value of the circuit, which may include at least one resistor in an upstream device. The example instructions further include determining identifier instructions 923. In this regard, the processor may map the resistance value of the circuit to a unique identifier.

Thus, in accordance with various examples described herein, identification of an auxiliary device is readily determined based on the location, or position, of the auxiliary device relative to a primary device.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A method, comprising:
   receiving a voltage signal from an upstream device in a plurality of devices in electrical communication, the plurality of devices being connected in series;
   determining a resistance value, the resistance value being based on a combination of resistors including a first resistor in the upstream device and a second resistor in a downstream device, the first and second resistors in parallel with each other, the combination of resistors being different from a combination associated with each other device of the plurality of devices; and
   determining an identifier based on the resistance value.

2. The method of claim 1, wherein the plurality of devices includes a primary device in a most upstream position in the series and at least one auxiliary device.

3. The method of claim 2, wherein the primary device is a printing device and the auxiliary device is a paper tray.

4. The method of claim 2, wherein the upstream device is the primary device, and the first resistor in the primary device has a resistance value different than the second resistor.

5. A non-transitory computer-readable storage medium encoded with instructions executable by a processor of a computing system, the computer-readable storage medium comprising instructions to:
   receive a voltage signal from an upstream device in a plurality of devices in electrical communication, the plurality of devices being connected in series;
   determine a resistance value, the resistance value being based on a combination of resistors including a first resistor in the upstream device and a second resistor in a downstream device, the first and second resistors in parallel with each other, the combination of resistors being different from a combination associated with each other device of the plurality of devices; and
   determine an identifier based on the resistance value.

6. The non-transitory computer-readable storage medium of claim 5, wherein the plurality of devices includes a primary device in a most upstream position in the series and at least one auxiliary device.

7. The non-transitory computer-readable storage medium of claim 6, wherein the primary device is a printing device and the auxiliary device is a paper tray.

* * * * *